United States Patent [15] 3,656,916
Schiedermaier et al. [45] Apr. 18, 1972

[54] PRODUCTION OF PHOSPHONITRILIC CHLORIDES

[72] Inventors: Richard Schiedermaier; Karl Wintersberger, both of Ludwigshafen; Gerd Wunsch, Speyer, all of Germany

[73] Assignee: Badische Anilin- & Soda-Fabrik Aktiengesellschaft, Ludwigshafen, Rhine, Germany

[22] Filed: Apr. 8, 1970

[21] Appl. No.: 26,749

[30] Foreign Application Priority Data

Apr. 12, 1969 Germany.....................P 19 18 697.1

[52] U.S. Cl............................................................23/357
[51] Int. Cl....................................C01b 21/52, C01b 25/00
[58] Field of Search.....................................................23/357

[56] References Cited

UNITED STATES PATENTS 3,359,080  12/1957  Ridgway et al. .........................23/357

FOREIGN PATENTS OR APPLICATIONS 1,041,017  10/1958  Germany.................................23/357

905,314  9/1962  Great Britain............................23/357

OTHER PUBLICATIONS

Moureu et al. (1), " Bul. Soc. Chim.," Vol. 3, 1936, pp. 821–828.
Moureu et al. (2), " Bul. Soc. Chim.," Vol. 3, 1936, pp. 829–835.

*Primary Examiner*—Herbert T. Carter
*Attorney*—Johnston, Root, O'Keeffe, Keil, Thompson & Shurtleff

[57] ABSTRACT

Phosphonitrilic chlorides having the general formula: $(PNCl_2)_n$ where $n$ denotes an integer of at least 3 and which contain a high proportion of trimeric and tetrameric cyclic phosphonitrilic chlorides are prepared by reaction of phosphorus pentachloride with ammonia in an inert solvent. The solution should contain not more than 5 moles of phosphorus pentachloride per liter. Ammonia is introduced at a rate not exceeding 0.12 liter per minute per mole of the phosphorus pentachloride contained in the whole solution until one tenth to one third of the total amount of ammonia required has been introduced.

4 Claims, No Drawings

PRODUCTION OF PHOSPHONITRILIC CHLORIDES

It is known (from Gmelin, 8th edition, 1965, volume 16 c, pages 549 et seq.) that phosphonitrilic chlorides are obtained by reaction of phosphorus pentachloride with ammonia or ammonium chloride, in the presence or absence of an inert solvent at elevated temperature. A mixture of phosphonitrilic chlorides having varying degrees of polymerization is obtained according to the equations:

$$nPCl_5 + nNH_4Cl \rightarrow (NPCl_2)_n + 4nHCl$$
$$nPCl_5 + nNH_3 \rightarrow (NPCl_2)_n + 3nHCl$$

$n$ being an integer of 3 or more. Cyclic or chain phosphonitrilic chlorides are formed.

The ratio of the cyclic: chain phosphonitrilic chlorides contained in the reaction mixture may be varied within certain limits by varying the amounts of phosphorus pentachloride and of ammonia chloride used.

It is also known that in order to obtain low molecular weight phosphonitrilic chlorides, particularly trimeric and tetrameric cyclic phosphonitrilic chlorides (UK Patent No. 905,314) the major proportion of the total amount of phosphorus pentachloride required for the reaction may be added continuously during the whole of the reaction period. The phosphorus pentachloride may be added as such (i.e. as a solid substance), or dissolved in a solvent.

The present invention has an object the production of phosphonitrilic chlorides having a high proportion of low molecular weight, particularly trimeric and tetrameric, cyclic phosphonitrilic chlorides by a simpler method.

We have found that phosphonitrilic chlorides having the general formula $(PNCl_2)_n$ where $n$ denotes an integer of at least 3 and having a high proportion of trimeric and tetrameric cyclic phosphonitrilic chlorides can be prepared by reaction of phosphorus pentachloride with ammonia in the presence of an inert solvent by introducing ammonia at the beginning of the reaction at a rate of not more than 0.12 liter per minute per mole of phosphorus pentachloride contained in the solution (the solution containing not more than 5 moles of phosphorus pentachloride per liter) until an amount of ammonia equivalent to one tenth to one third of the total amount of ammonia required has been introduced.

In order to obtain a high proportion of cyclic trimeric and tetrameric phosphonitrilic halides in the reaction product, it is essential not to start from too concentrated solutions and it is also essential to introduce the ammonia slowly into the solution of phosphorus pentachloride at the beginning of the reaction. When the rate of addition or the concentration specified above is increased, higher molecular weight phosphonitrilic chlorides are formed which only dissolve partially, or do not dissolve so well, as the said cyclic phosphonitrilic chlorides, in hydrocarbons, for example cyclohexane or ligroin. Maintenance of a rate which is not above the above-mentioned maximum rate of introduction at the beginning of the reaction is essential in order to achieve a high proportion of cyclic trimeric and tetrameric phosphonitrilic chlorides. Any lower rate of introduction below the said maximum rate of introduction may be chosen without the said high proportion being impaired. In order to achieve adequate space-time yields, however, a lower rate of introduction than 0.01 liter per minute per mole of phosphorus pentachloride contained in the solution should not be chosen. It is preferable to select a rate of introduction of from 0.04 to 0.08 liter of ammonia per minute per mole of phosphorus pentachloride. The maintenance of a specific rate of introduction is not of decisive significance for the remainder of the amount of ammonia in respect of the production of a high proportion of low molecular weight phosphonitrilic chlorides. The remaining amount of ammonia is preferably introduced at a higher rate of introduction to achieve good space-time yields.

As regards concentration it may be said that any concentration lower than 5 moles of phosphorus pentachloride per liter of solution may be chosen without the proportion of the said cyclic phosphonitrilic chlorides being impaired. It is advantageous however to use solutions which contain at least 1 mole of phosphorus pentachloride per liter of solution, for example 1 to 3 moles of phosphorus pentachloride per liter of solution.

As is already known, chlorinated hydrocarbons are particularly suitable as inert solvents. Examples are carbon tetrachloride, chloroform, chlorobenzene and 1,1,2,2-tetrachloroethane. The reaction is advantageously carried out at an elevated temperature above 60° C. up to the boiling point of the solvent used. It is advantageous to carry out the reaction at a temperature of from 90° eto 120° C. and therefore to choose a solvent whith an appropriately high boiling point. It is advantageous to heat the reaction mixture for another 30 minutes to 2 hours under reflux after the reaction is over in order to expel hydrogen chloride formed during the reaction. 1 mole of ammonia is required for the reaction for each mole of phosphorus pentachloride according to the equation given above. It is sufficient to introduce for the reaction the stoichiometric amount of ammonia up to an excess of 10 percent over the amount stoichiometrically required.

The invention is illustrated by the following Examples.

EXAMPLE 1

One hundred and fifty-five g of white phosphorus (5 moles) is dissolved in 4,000 ml of 1,1,2,2-tetrachloroethane at 80° C. While stirring vigorously, first 292 liters of chlorine is introduced for 2 hours 30 minutes and then 124 liters of gaseous ammonia is introduced in the course of 4 hours, the solution being kept at a temperature of 110° to 120° C. The ammonia is metered in during the first ninety minutes at a rate of 19.3 liters per hour (equivalent to a rate of 0.065 liter of $NH_3$ per mole of phosphorus pentachloride per minute) and in the remaining 2 hours 30 minutes at a rate of 38 liters per hour. The reaction mixture is then allowed to boil under reflux for 1 hour. The solution is filtered and the solvent is removed from the filtrate by distillation at 12 mm. The crude product, in which 95 percent of the amount of phosphorus used is contained, is taken up in ligroin. After the ligroin has been distilled off, 454 parts by weight of crystallized trimeric and tetrameric phosphonitrilic chloride can be recovered (equivalent to a yield of 88 percent with reference to the amount of phosphonitrilic used); the remainder consists of phosphorus nitride chlorides of higher molecular weight.

EXAMPLE 2

Seven hundred and forty-five g (10.5 moles) of chlorine is introduced in the course of ninety minutes into a mixture of 1,373 g of phosphorus trichloride (10 moles) and 4,430 g of chlorobenzene with vigorous stirring at 95° C.

The temperature is then raised to 115° C. and gaseous ammonia is passed in for 2 hours 30 minutes at a rate of 0.5 liter per minute, equivalent to a rate of 0.05 liter of $NH_3$ per minute per mole of phosphorus pentachloride. The remainder of the ammonia is passed in at a rate of 0.97 liter per minute in the course of 2 hours 45 minutes. A total of 117.6 g of ammonia (10.44 moles) is introduced. When the supply of ammonia is over, the reaction mixture is boiled under reflux for one hour. The solution is filtered and the solvent is removed from the filtrate by distillation at a pressure of 12 mm. The crude product soluble in hydrocarbons contains 93 percent of the amount of phosphorus used. Two hundred and ninety-two g of crystallized trimeric and tetrameric phosphonitrilic chloride (equivalent to 83 percent of the amount of phosphorus used) and 120 g of oligomeric higher cyclic phosphonitrilic chlorides (equivalent to 10 percent of the phosphorus used) are obtained therefrom.

We claim:

1. A process for the production of mixtures of phosphonitrilic chlorides having a high proportion of trimeric and tetrameric cyclic phosphonitrilic chlorides plus higher cyclic oligomers thereof which comprises reacting phosphorus pentachloride with ammonia in a chlorinated hydrocarbon, inert solvent at a temperature of about 60°C up to the boiling point of the solvent, and at the beginning of the reaction passing the ammonia into the solution which contains not more than 5 moles of phosphorus pentachloride per liter at a rate not exceeding 0.12 liter per minute per mole of phosphorus pentachloride contained in the whole of the solution until an amount equivalent to one tenth to one third of the total amount of ammonia necessary has been introduced.

2. A process as claimed in claim 1 wherein
the ammonia is passed in at a rate of from 0.04 to 0.08 liter per minute per mole of phosphorus pentachloride containing in the whole of the solution.

3. A process as claimed in claim 1 wherein
the solution contains 1 to 3 moles of phosphorus pentachloride per liter.

4. A process as claimed in claim 1 carried out at a temperature of from 90° to 120° C.

* * * * *